United States Patent [19]

Hillestad

[11] Patent Number: 5,199,221
[45] Date of Patent: Apr. 6, 1993

[54] TUBE CUTTING APPARATUS

[76] Inventor: Tollief O. Hillestad, 108 9th Ave., W. Summerland Key, Fla. 33042

[21] Appl. No.: 835,280

[22] Filed: Feb. 13, 1992

[51] Int. Cl.⁵ .............................................. B26D 1/18
[52] U.S. Cl. ....................................... 51/34 G; 83/54; 83/486.1; 83/487; 83/629; 83/745
[58] Field of Search ............... 83/745, 486.1, 455, 83/743, 487, 488, 489, 54, 629, 928; 51/34 C, 34 G

[56] References Cited

U.S. PATENT DOCUMENTS

| | | | |
|---|---|---|---|
| 776,743 | 12/1904 | Von Holdt | 83/743 |
| 2,378,554 | 6/1945 | Irwin, Jr. | 83/743 |
| 2,573,991 | 11/1951 | Schildknecht | 83/743 |
| 2,608,220 | 8/1952 | Cauthen | 83/745 |
| 3,073,073 | 1/1963 | Van Pelt | 83/745 X |
| 3,323,507 | 6/1967 | Schuman | 125/14 |
| 3,465,793 | 9/1969 | Zuk | 83/477.2 X |
| 3,504,715 | 4/1970 | Miles | 83/487 |
| 3,722,497 | 3/1973 | Hiestand et al. | 125/14 |
| 3,763,845 | 10/1973 | Hiestand et al. | 125/14 |
| 4,054,179 | 10/1977 | Destree | 83/471.2 X |
| 4,152,961 | 5/1979 | Batson | 83/486.1 |
| 4,338,051 | 7/1982 | Garver et al. | 83/488 X |
| 4,549,455 | 10/1985 | Perilloux, Jr. | 83/477.2 |
| 4,576,076 | 3/1986 | Pyle | 83/471.3 |
| 4,599,774 | 7/1986 | Till, Jr. | 29/157.4 |
| 4,633,555 | 1/1987 | Legge | 29/157.4 |
| 4,718,201 | 1/1988 | Legge | 51/241 S |
| 4,739,688 | 4/1988 | Brennan et al. | 83/745 |
| 4,830,551 | 5/1989 | Brennan et al. | 83/745 X |
| 4,836,494 | 6/1989 | Johnsen | 125/14 X |
| 4,909,114 | 3/1990 | Astle | 83/745 |
| 5,033,347 | 7/1991 | Hillestad et al. | 83/487 |
| 5,107,594 | 4/1992 | Ferreras | 83/745 X |

FOREIGN PATENT DOCUMENTS 407735  12/1924  Fed. Rep. of Germany.

Primary Examiner—Frank T. Yost
Assistant Examiner—Kenneth E. Peterson
Attorney, Agent, or Firm—Hudak & Shunk Co.

[57] ABSTRACT

A portable tube cutting apparatus which facilitates smooth even cuts. The apparatus has a frame supporting a movable carriage, a motor driven cutting tool secured to the carriage, and vise-like fasteners for supporting the frame from a stationary object, such as the tube which is to be cut. A pair of spaced parallel rods, secured to the frame, pass through a pair of corresponding cylindrically bored guides attached to the carriage to restrict movement of the carriage to a linear path which passes through the tube which is to be cut while the apparatus is being used. A rack and pinion arrangement operably connected to a lever is preferably provided for smoothly advancing the carriage toward the tube.

18 Claims, 3 Drawing Sheets

TUBE CUTTING APPARATUS

FIELD OF THE INVENTION

The present invention relates to a device for supporting cutting means for linear motion along a fixed plane relative to the axial direction of a tube which is to be cut in order to produce a smooth, even cut.

BACKGROUND OF THE INVENTION

In certain industrial process plants, as for example in steam generating plants, it often becomes necessary to cut out and replace sections of pipe or tubing which have rusted or otherwise become damaged or deteriorated. Such tubing is customarily removed by cutting the tubing with hand held tools such as motor driven saws or cutting torches. These hand directed tools generally produce uneven cuts which make it difficult to weld a replacement pipe onto the cut pipe. Replacement of tubing using hand held cutting tools, therefore, results in high labor costs because of the time and care required to produce an even cut and/or the time and skill required to weld at an uneven cut.

U.S. Pat. No. 5,033,346 to Hillestad et al discloses an apparatus for cutting boiler tubes comprising a movable carriage having a cutting means where the carriage and cutting means are supported on a lateral supporting beam secured adjacently to a bank of boiler tubes. The movable carriage means is stabilized with a plurality of bearings means for engaging the lateral beam and preventing strain and vibrations during the cutting process. The cutting means is preferably powered by a pneumatic motor.

Other known means for holding a motor activated cutting device lack sufficient rigidity to prevent undue flexing and rapid destruction of the cutting blade resulting in a costly, time consuming process, or are unduly cumbersome, again resulting in high labor costs.

SUMMARY OF THE INVENTION

The invention is a portable device for supporting a motor driven cutting means for linear motion along a fixed plane relative to the axial direction of a tube which is to be cut and replaced. By supporting the cutting means for motion in one direction, the device makes it simple to produce a smooth, even cut in the tube, making it relatively easy to prepare a tube for welding.

The device has a carriage upon which a motorized cutting means is securely attached. The carriage is movably attached to a frame which has fastening means for firmly fixing the frame to an object which is immovable relatively to the tube which is to be cut. Movement of the carriage relative to the frame, and hence movement of the cutting means relative to the tube to be cut, is restricted by guide means along a linear path. The device, in addition to providing a smooth, even cut, avoids flexing or strain on the cutting element thereby prolonging its useful life.

BRIEF DESCRIPTION OF THE DRAWINGS

FIG. 5 is a plan view of a clamp which may be used in conjunction with the apparatus.

DESCRIPTION OF THE PREFERRED EMBODIMENT

Figure 1:
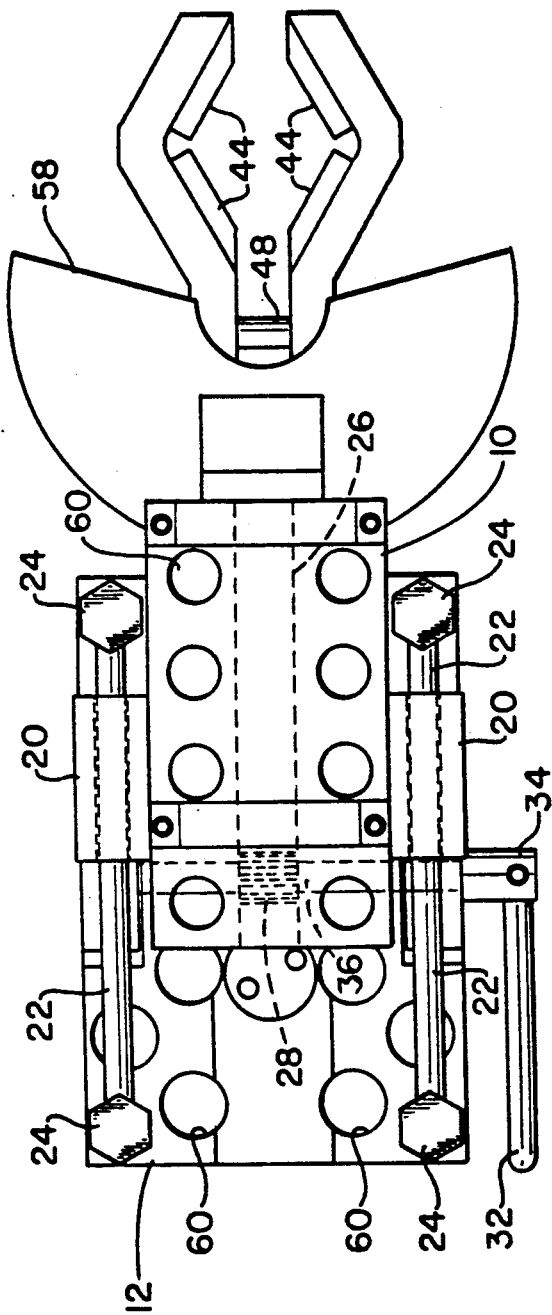
FIG. 1 is a top view of the cutting apparatus.
Figure 2:
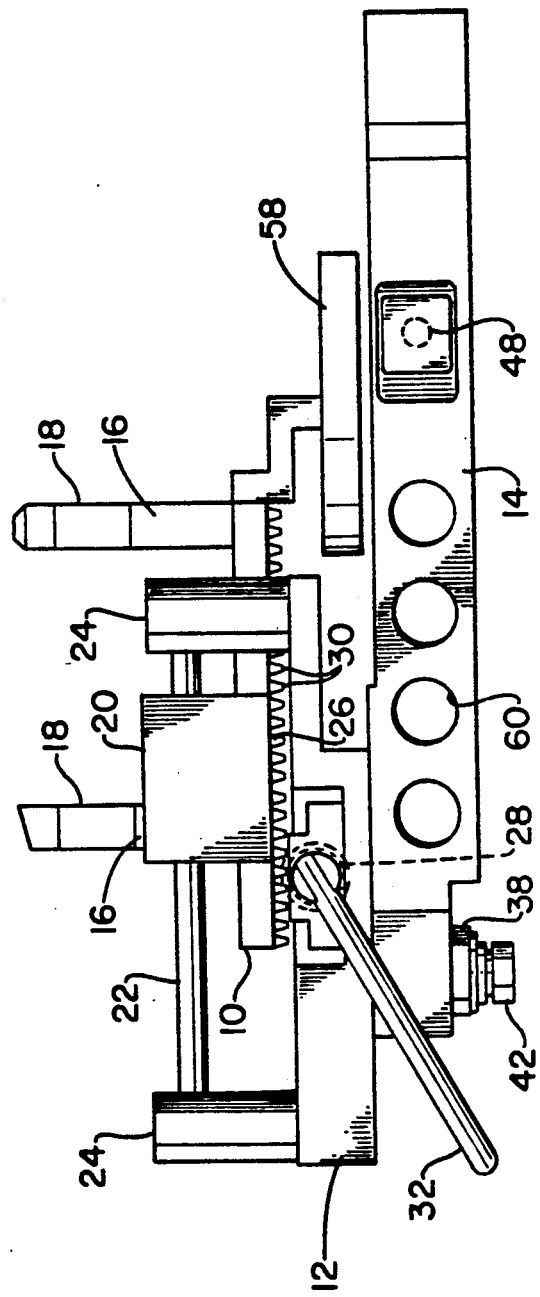
FIG. 2 is a side elevational view thereof.
Figure 3:
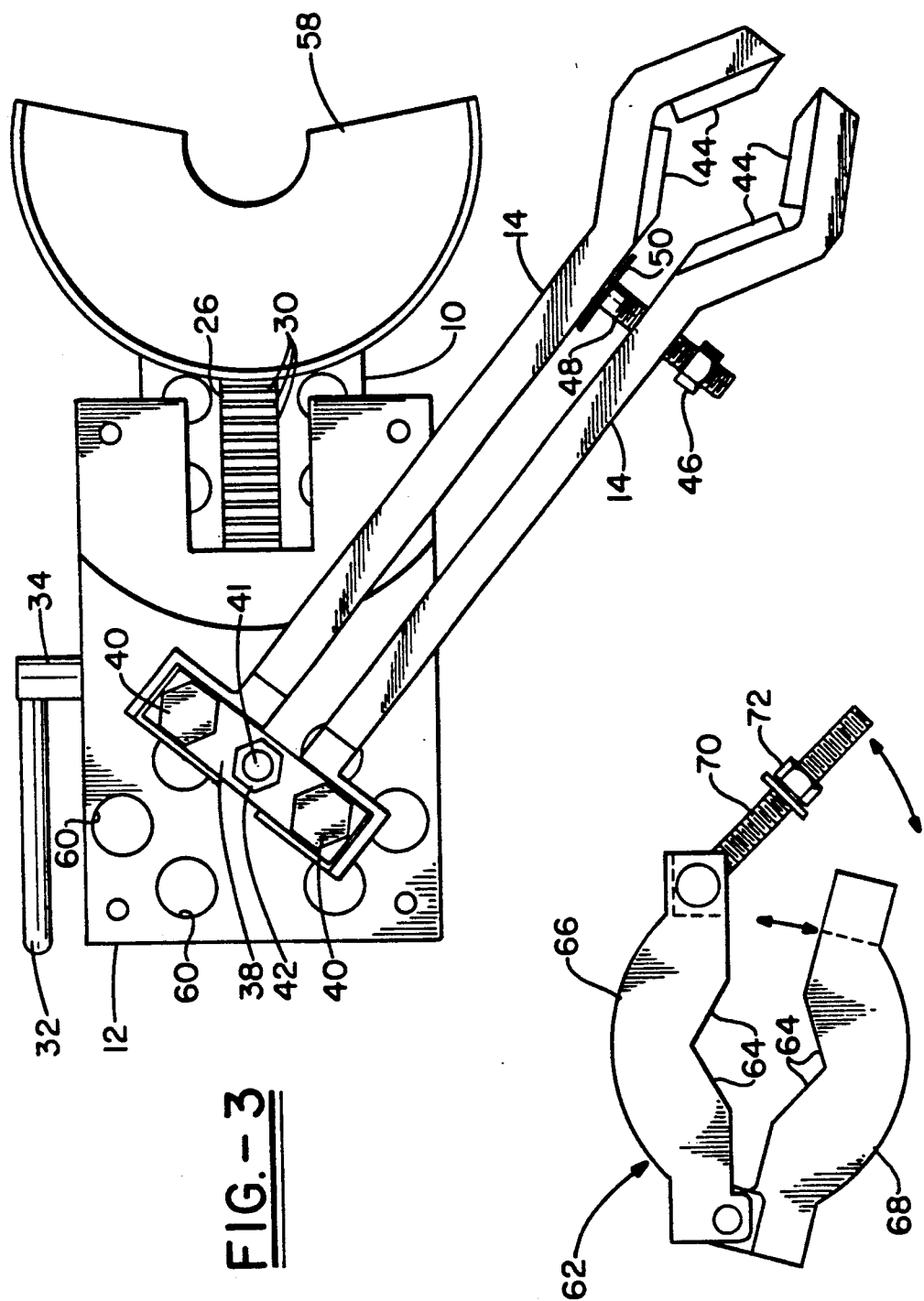
FIG. 3 is a bottom plan view showing the saw frame rotated approximately 40° with respect to the clamp member.

The device broadly comprises a carriage 10 adapted for movement in a linear direction relative to a frame 12 which has support means for fixing the device to a stationary object capable of supporting the device.

Referring to the figures generally, the carriage 10 has a flat rectangular base with upwardly projecting supports 16 onto which a cutting tool 52 (shown in FIG. 4) is placed. The cutting tool 52 is securely fastened onto the carriage 10 with fasteners 18 which are connected to the supports 16 by screws or other suitable means. Various other means, such as straps, may be used for securing the cutting tool 52 to the carriage. A pair of block-shaped guides 20 project upwardly from opposite sides of the carriage 10. Each guide 20 has a bore extending therethrough in a direction parallel to the direction of the cutting tool path. A bushing is inserted into each bore to provide a smooth non-abrading interior bore surface through which one of a pair of parallel guide rods 22 pass. The parallel guide rods 22 are mounted to the frame 12 by means of posts 24 with the axes of the rods being parallel with the direction of the cutting tool path. The guides 20 and rods 22 restrict movement of the carriage 10 to a single linear path relative to the frame 12. The posts 24 also act as stops to define the extent to which the carriage is permitted to travel along the linear path. The diameter of the rods 22 are in close tolerance with the dimensions of the bushing surface to eliminate movement of the carriage 10 with respect to the frame 12 except in the direction parallel to the axes of the rods 22. Various other guide means for restricting the movement of one part of an apparatus to a single direction with respect to another part, such as those used on sliding drawers, would also be suitable for use with the invention.

The device is preferably provided with a rack 26 and pinion gear 28 arrangement which is operative to advance the carriage 10 and attached cutting tool 52 along a linear cutting path parallel to the axes of the rods 22. The pinion gear 28 is centrally located on the frame 12 and engages the teeth 30 of rack 26 which is affixed longitudinally along the bottom of the carriage 10. The pinion gear 28 can be rotated by turning lever 32 operatively secured by hub 34 to a transverse rod 36 passing through a bearing opening in a side wall of frame 12 and axially secured to pinion gear 28. Rotation of pinion gear 28 causes meshing of pinion gear 28 with rack 26 to effect movement of the carriage 10 relative to the frame 12 along the linear cutting path. The pinion gear may be power operated although hand controlled rotation is preferred. Alternative means for advancing the carriage, such as a screw drive, gears, and/or chains, are well known and are therefore considered to be within the scope of the invention. While the carriage 10 is preferably advanced by means of a rack and pinion gear mechanism, the invention is capable of functioning without any special means for advancing the carriage as by merely pushing the carriage forward by hand.

Vice-like fastening or clamping means, comprising a pair of congruous support arms 14 which can be forced toward each other to grip an intervening object are pivotally connected to hinge member 38 which in turn is pivotally connected to frame 12, is used for fastening the device to the tube to be cut or an object which is stationary relative to the tube which is to be cut. Each support arm 14 has an enlarged block-shaped terminal portion having a large centered bore through which the arm 14 is connected to hinge member 38, and a V-shaped section at the other end which cooperates with the V-shaped section of the other arm to grip an object. A hinge pin 40 passes through the bore at the end of each arm 14 and through a bore at an end of hinge 38 pivotally connecting each arm 14 to hinge 38. A threaded rod 41 or bolt fixedly depending from a central portion of the frame and passing through a hole in hinge member 38 centered between the two end bores is used in combination with a lug nut 42 to reversibly secure the fastening means to the frame 12. This arrangement allows rotational adjustment of the frame relative to the fastening means. This feature can be beneficial in situations where the device is attached to a stationary object other than the tube Which is itself to be cut, and makes it possible to make parallel cuts through two or more closely spaced tubes without having to reposition the entire device or take measurements.

The open sides of the V-shaped sections at one end of each of the arms 14 face each other to provide opposing jaws for gripping an object. Because the gripping surfaces encounter frequent abrasion during use, replaceable grip pads 44 are preferably attached to the gripping surfaces of the arms 14 with screws or other suitable reversible attachment means. The fastening means are tightened by rotating nut 46 on threaded bolt 48. Cotter pin 50 is positioned through a small diameter bore in bolt 48 to prevent inadvertent removal and loss of the bolt. While the clamping or fastening means described above and shown in the drawings are suitable for clamping onto a variety of different types of objects, they are particularly well suited for fastening the device to circular tubing and most preferably to the tube which is to be cut. Other known clamping or fastening devices, such as a screw clamp, are possible and are considered to be within the scope of the invention.

Figure 4:
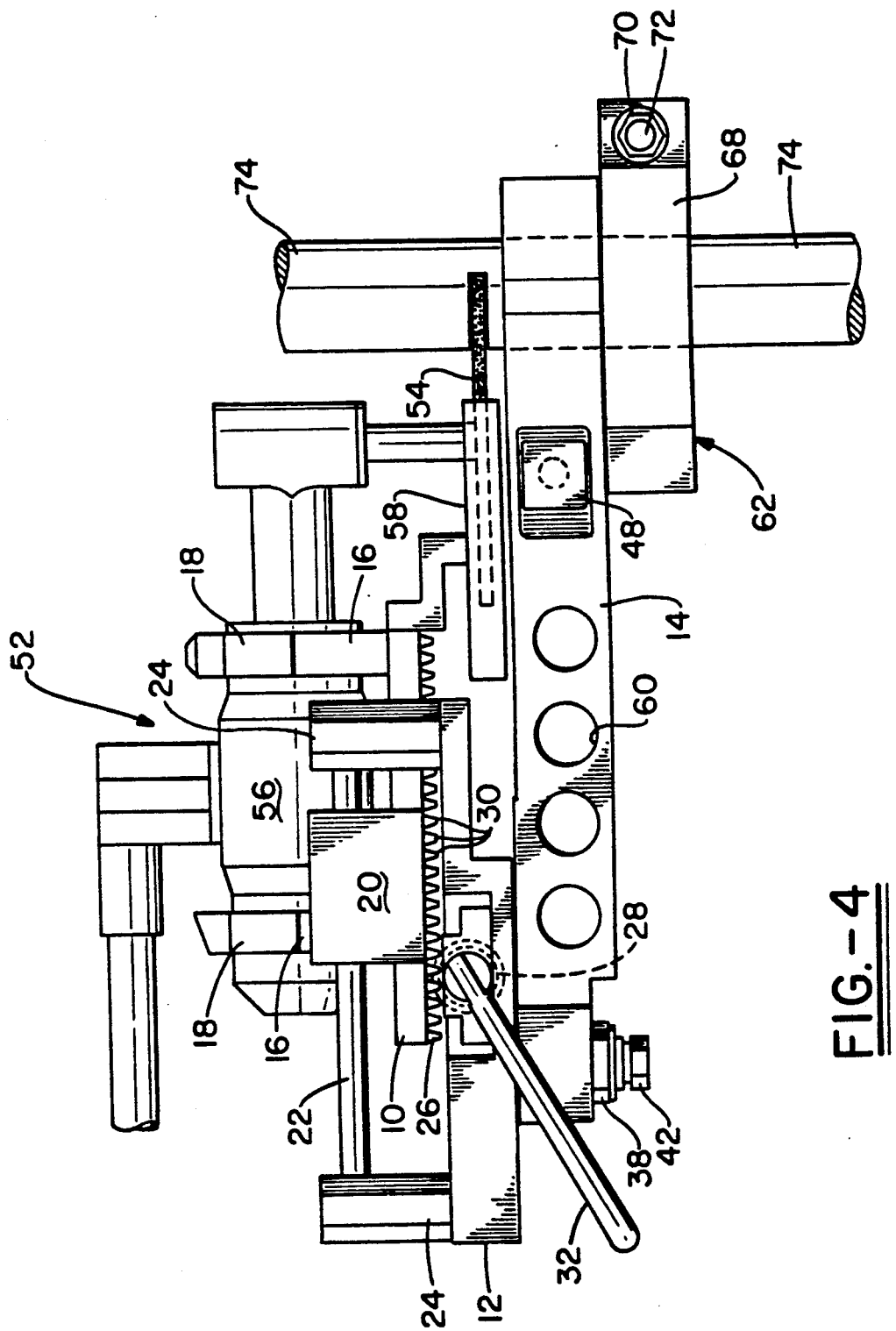
FIG. 4 is a side elevational view similar to FIG. 2 illustrating the apparatus as it may be applied to holding a pneumatic saw.

Referring to FIG. 4, the device is preferably used in association with a cutting tool having a rotating circular blade 54 or disk operatively actuated by a power source such as a motor 56. The preferred motor 56 is a pneumatic motor typically comprising a multiple vane air driven motor and powered by compressed air ordinarily available in industrial plants. A satisfactory pneumatic motor for use in the present invention generates about 3 to about 7 and desirably from about 4.5 to about 5.5 horsepower and about 3,500 to about 6,500 and desirably from about 4,500 to about 5,500 RPM at a standard factory air pressure of about 90 psi.

For safety reasons, the device preferably has a blade guard 58 attached to the carriage 10 and covering that portion of the blade facing the operator.

The major components of the device, such as the frame 12, support arms 14 and carriage 10 are preferably machined from aluminum. Aluminum is preferred because it has a good balance of desirable properties, such as light-weight, high-strength, toughness and corrosion resistance. The replaceable grip pads are preferably made from carbon steel because of its relatively low cost and toughness.

To further reduce the weight of the device without deleteriously affecting its structural strength, holes 60 are preferably provided in selected locations on the carriage 10, frame 12 and support arms 14.

As shown in FIG. 4, the device is preferably, but not necessarily, used in association with a guide clamp 62. Preferably, the guide clamp 62 is firmly bolted to a vertical tube. As seen in FIG. 5, the guide clamp 62 consists of two congruous jaw members 66 and 68 hingedly connected to one another at one end. The jaw members have opposing V-notches which provide gripping surfaces 64 which are forced into tight abutment with portions of the circumferential surface of a tube 74 to which clamp 62 is attached when bolt 70, pivotally connected to jaw member 66, is rotated toward laterally slotted jaw member 68 and nut 72 is rotated on threaded bolt 70 into tight abutment with the outer surface of jaw member 68. By first bolting guide clamp 62 to tube 74, the device can be more easily manipulated and properly positioned for mounting since the flat surfaces of the clamp 62 normal to the tube axis can be used as a guide and to partially bear the weight of the device while it is being fastened to the tube 74. To fasten the device to an object, such as the tube 74 which is to be cut, carriage 10 is fully retracted, nut 46 is loosened and arms 14 are positioned so that the tube 74 is axially centered between the surfaces of grip pads 44. Nut 46 is then tightened to bring the grip pads 44 into tight abutment with the circumferential surface of the tube 74, with friction between the pads 44 and the tube 74 being utilized to support the device. The device is most desirably used to cut the tube upon which it is mounted, as shown in FIG. 4. The device can, however, be used to cut tubes adjacent to the tube from which the device is being supported by loosening nut 42, rotating the frame 12 relative to the arms 14, and retightening nut 42 after the device has been properly positioned so that the blade 54 can be advanced toward and through the adjacent tube. After the device is properly positioned, the motor 56 is turned on, actuating the rotating blade 54, and the carriage 10 is advanced toward the tube 74 at a controlled rate by rotating lever 32. The carriage is gradually advanced until the tube is completely cut through.

Although the present invention has been described for use in cutting vertical tubes, it is readily apparent that horizontal tubes or other axial directional tubes can be cut in accordance with the present invention.

While in accordance with the Patent Statutes, the best mode and preferred embodiment has been set forth, the scope of the invention is not limited thereto, but rather by the scope of the attached claims.

What is claimed is:

1. A tube cutting apparatus, comprising:
    a frame,
    a movable carriage supported on said frame and adapted to move along a linear path passing through a tube which is to be cut,
    means for guiding said carriage along said linear path to substantially eliminate movement of the carriage except along said linear path,
    means for supporting said frame from a stationary object, said support means comprising a pair of congruous support arms and means for forcing said arms toward each other to grip an intervening object,
    means for reversibly securing and pivotally connecting said frame to said support means to allow for rotational adjustment of said frame relative to said support means about an axis parallel with the longitudinal axis of said tube which is to be cut, and cutting means secured to said movable carriage, said movable carriage and cutting means cooperable to cut said tube along a plane perpendicular to the axis of said tube.

2. A tube cutting apparatus as set forth in claim 1, further comprising means operable to effect movement of said carriage along said linear path.

3. A tube cutting apparatus as set forth in claim 2, wherein said operable means comprises a rack, having a plurality of teeth, affixed longitudinally along the bottom of said carriage, and a pinion gear centrally located on said frame, said pinion gear having teeth, the teeth of said pinion gear engaging the teeth of said rack, whereby rotation of said pinion gear causes meshing of said pinion gear with said rack to effect movement of said carriage along said linear path.

4. A tube cutting apparatus as set forth in claim 1, wherein said guide means comprises a pair of spaced parallel rods, mounted to said frame, and passing through a corresponding pair of cylindrically bored guides attached o said carriage, said bores being dimensioned to allow said carriage to be moved only along said linear path parallel to said rods.

5. A tube cutting apparatus as set forth in claim 1, wherein said reversible securing and pivotally connecting means comprises a threaded rod fixedly depending from said frame, a hole in said support means which said depending rod passes through, and a nut having internal threads which cooperate with the threads of said rod to reversibly secure said support means to said frame.

6. A tube cutting apparatus as set forth in claim 1, wherein said cutting means is powered by a pneumatic motor.

7. A tube cutting apparatus as set forth in claim 1, wherein said cutting means is a motor driven rotating abrasive wheel.

8. A tube cutting apparatus as set forth in claim 1, wherein said cutting means is a motor driven rotating carbide disk.

9. A tube cutting apparatus, comprising:
a frame;
a movable carriage supported on said frame;
means for restricting the movement of said carriage to a linear path passing through a tube which is to be cut;
a vise-like fastener for supporting said frame on a stationary object, said fastener being reversibly secured and pivotally connected to said frame to allow rotational adjustment of said frame relative to said fastener about an axis parallel with the longitudinal axis of said tube which is to be cut, said fastener comprising a pair of pivoting arms connected to said frame, means for urging said arms toward each other, said arms having opposing jaws at one end for gripping objects interposed between said jaws when said arms are urged together;
cutting means secured to said movable carriage,
said movable carriage and cutting means cooperable to cut the tube along a plane perpendicular to the axis of said tube.

10. A tube cutting apparatus as set forth in claim 9, wherein said restricting means comprises a pair of spaced parallel rods, mounted to said frame and passing through a pair of corresponding cylindrically based guides attached to said carriage, said bases being dimensioned to allow said carriage to be moved only along said linear path parallel to said rods.

11. A tube cutting apparatus as set forth in claim 9, further comprising means operable for effecting movement of said carriage along said linear path.

12. A tube cutting apparatus as set forth in claim 11, wherein said operable means comprises a rack, having a plurality of teeth, affixed longitudinally along the bottom of said carriage, and a pinion gear secured to a transverse rod passing through a bearing opening in a side of said frame, said pinion gear having teeth, the teeth of said pinion gear engaging the teeth of said rack, whereby rotation of said pinion gear causes meshing of said pinion gear with said rack to effect movement of said carriage along said linear path.

13. A tube cutting apparatus as set forth in claim 12, wherein rotation of said pinion gear is effected by turning a lever operatively secured to said transverse rod.

14. A tube cutting apparatus as set forth in claim 9, wherein said cutting means is a pneumatic motor driven rotating carbide disk.

15. A tube cutting apparatus as set forth in claim 9, wherein said cutting means is a pneumatic motor driven rotating abrasive wheel.

16. A tube cutting apparatus, comprising:
a frame;
a movable carriage supported on said frame;
cutting means secured to said movable carriage;
means for clamping said frame to a stationary object, said clamping means comprising a pair of congruous support arms and means for forcing said arms toward each other to grip an intervening object;
means for reversibly securing and pivotally connecting said frame to said clamping means to allow for rotational adjustment of said frame relative to said clamping means about an axis of a tube which is to be cut, and
means for restricting movement of said carriage to a linear path passing through the tube which is to be cut, said movable carriage and cutting means cooperable to cut said tube along a plane perpendicular to the axis of said tube.

17. A tube cutting apparatus as set forth in claim 16, wherein said movement restricting means comprises a pair of spaced parallel rods, secured to said frame, and a pair of corresponding cylindrically bored guides attached to said carriage, said rods tightly passing through said bores to restrict movement of said carriage to a linear path parallel to said rods.

18. A tube cutting apparatus as set forth in claim 17, further comprising a rack affixed to said carriage, a pinion gear secured to a transverse rod passing through a bearing opening in said frame, the teeth of said pinion gear engaging the teeth of said rack, whereby rotation of said pinion gear causes meshing at said pinion gear with said rack to effect movement of said carriage along said linear path.

* * * * *